United States Patent [19]
Woodruff

[11] Patent Number: 5,845,687
[45] Date of Patent: Dec. 8, 1998

[54] VALVE SYSTEMS, PARTICULARLY FOR USE WITH AGRICULTURAL EQUIPMENT

[75] Inventor: Keith F. Woodruff, Mountainside, N.J.

[73] Assignee: American Cyanamid, Madison, N.J.

[21] Appl. No.: 819,823

[22] Filed: Mar. 18, 1997

Related U.S. Application Data

[60] Provisional application No. 60/014,172 Mar. 26, 1996.

[51] Int. Cl.$^6$ ....................................................... B65B 1/04
[52] U.S. Cl. .............................. 141/346; 141/18; 141/98; 141/360; 251/151
[58] Field of Search ........................... 141/346, 353–355, 141/360, 362, 364–366, 383, 384, 18, 98; 251/151, 149.4; 222/505, 507; 285/38, 39; 74/89.22, 89.2; 33/294, 296, 802, 501.02, 501.03

[56] References Cited

U.S. PATENT DOCUMENTS

| | | |
|---|---|---|
| 2,439,539 | 4/1948 | Cellwork .................................. 251/151 |
| 2,846,179 | 8/1958 | Monckton ............................... 222/507 |
| 3,843,095 | 10/1974 | Rupert .................................... 74/89.22 |
| 4,035,922 | 7/1977 | Von Voros ................................ 33/802 |
| 5,029,624 | 7/1991 | McCunn et al. . |
| 5,060,701 | 10/1991 | McCunn et al. . |
| 5,125,438 | 6/1992 | McCunn et al. . |
| 5,156,372 | 10/1992 | Conrad . |
| 5,224,527 | 7/1993 | McCunn et al. . |
| 5,248,070 | 9/1993 | Nolte et al. . |
| 5,301,848 | 4/1994 | Conrad et al. . |
| 5,379,812 | 1/1995 | McCunn et al. . |
| 5,564,309 | 10/1996 | Nakamura et al. .................... 74/89.22 |

OTHER PUBLICATIONS

Smartbox: Breakthrough Application System for Corn Rootworm Control, DuPont Agricultural Systems, Copyright 1995.

Hands–Off Insecticide System—by Kurt Lawton—FIN—Sep., 1995.

*Primary Examiner*—David J. Walczak
*Assistant Examiner*—Steven O. Douglas
*Attorney, Agent, or Firm*—Charles F. Costello, Jr.

[57] ABSTRACT

A device for converting linear movement into rotary movement includes a pair of pulleys mounted to a linearly movable supporting element. Selective linear movement of the supporting element drives a rotary element by a drive cable engaging the pulleys and the rotary element. The device is particularly adapted for use as a rotary valve for controlling the flow of product from an upper storage container to a lower hopper of an agricultural dispensing vehicle. An agricultural vehicle incorporating the rotary valve system of the present invention is provided with vertical supports for the product container enabling the vehicle to carry containers of larger size and increased storage capacity.

18 Claims, 4 Drawing Sheets

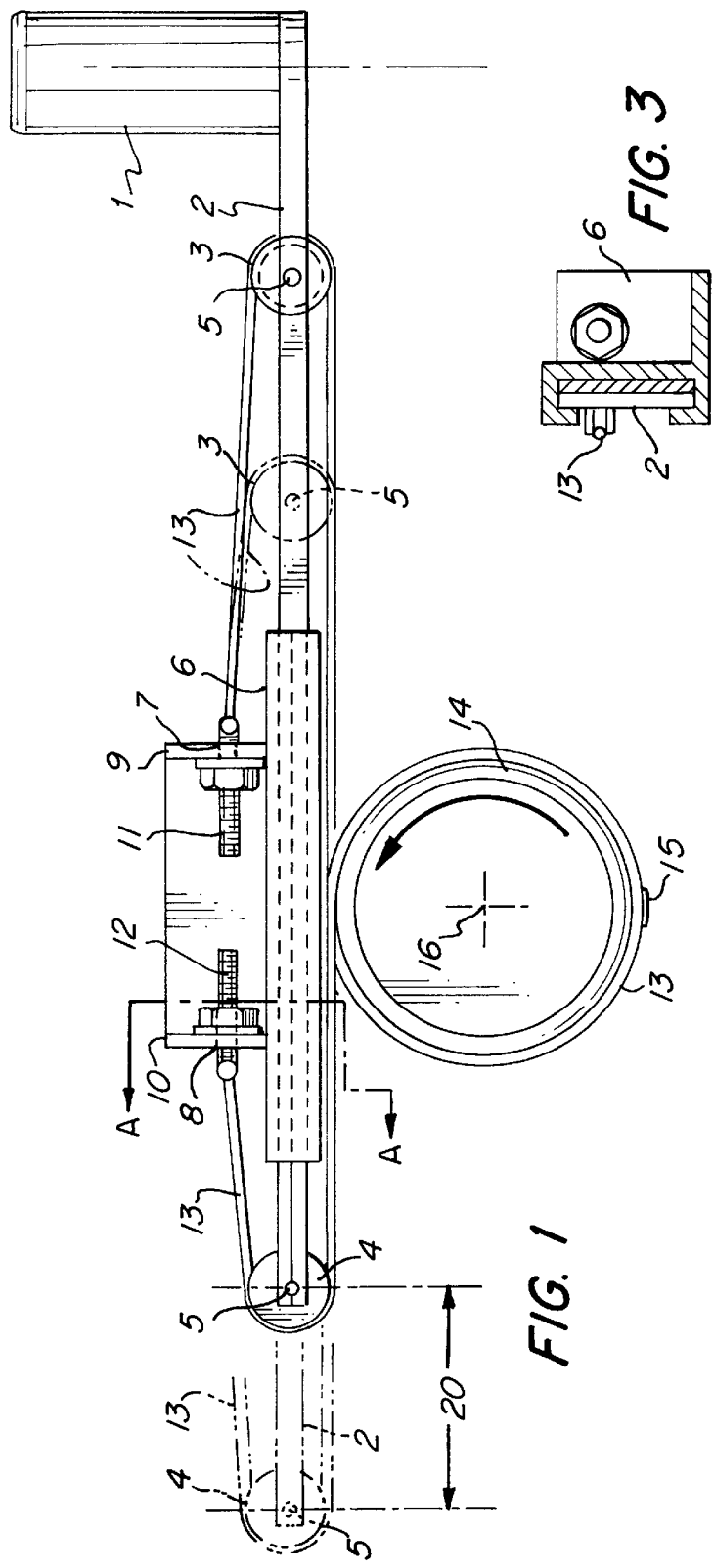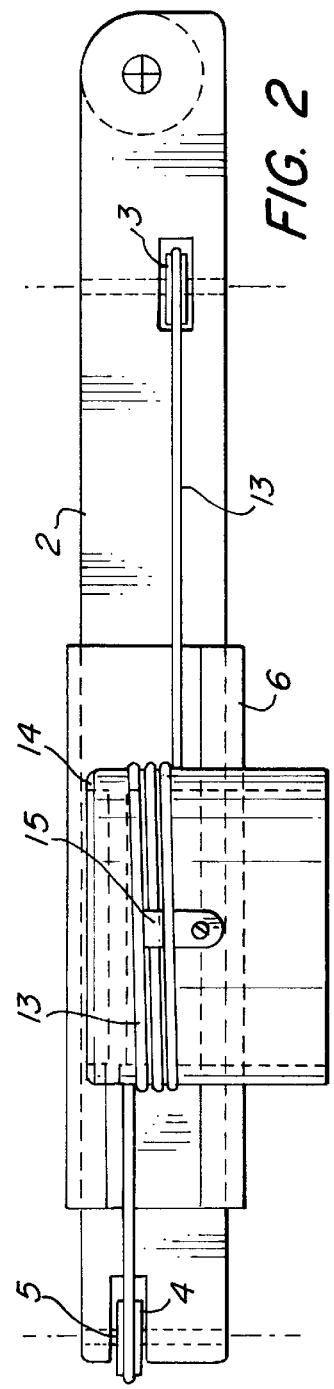

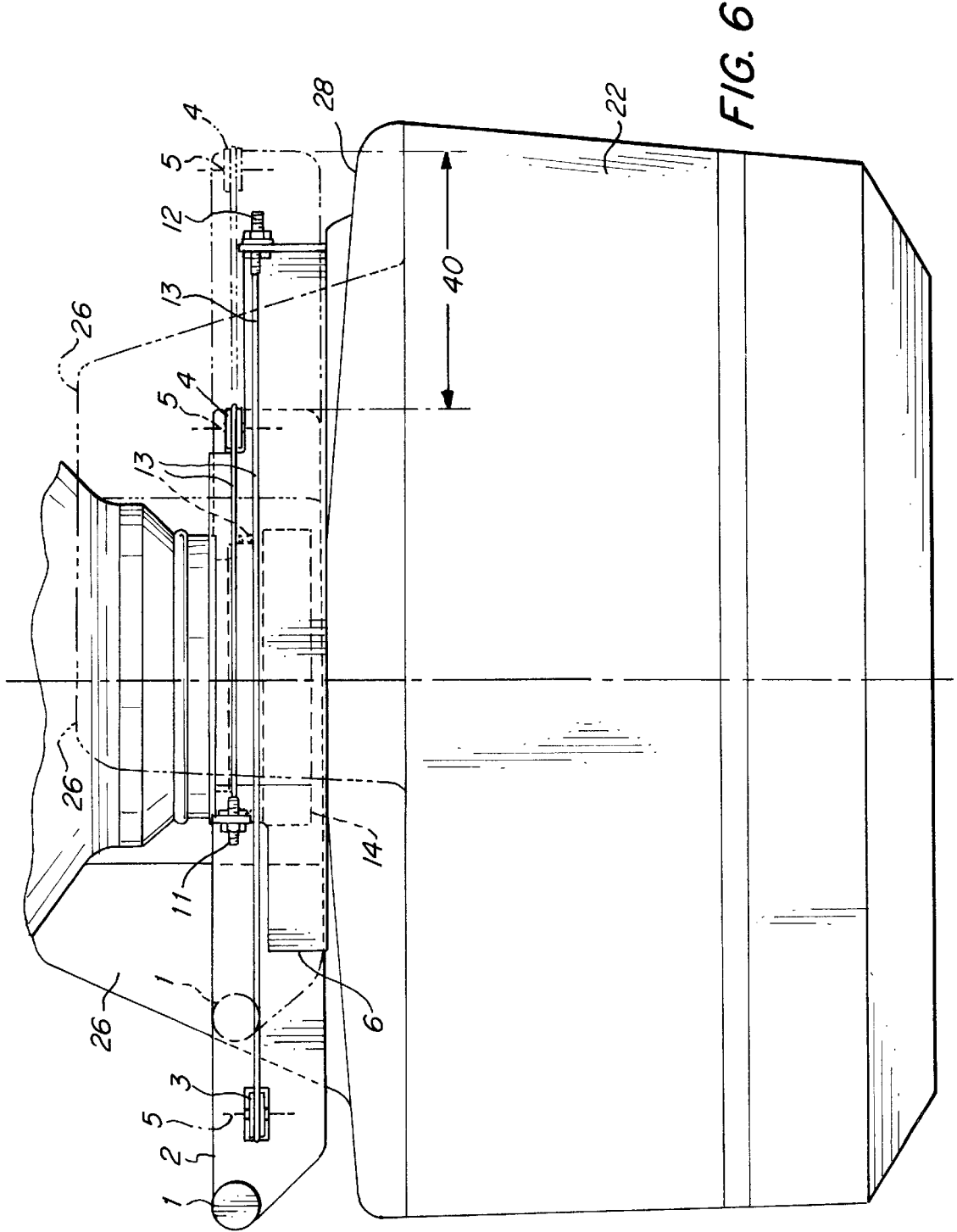

VALVE SYSTEMS, PARTICULARLY FOR USE WITH AGRICULTURAL EQUIPMENT

This application claims priority from copending U.S. provisional application Ser. No. 60/014,172 filed on Mar. 26, 1996.

BACKGROUND OF THE INVENTION

The present invention is directed to a device for converting selective linear movement into corresponding rotary movement, particularly adapted for use in an improved valve system. The improved valve system can be employed in an agricultural product dispensing vehicle (such as a planter) having a hopper for selectively dispensing agricultural product such as herbicides, pesticides or fertilizer and the like, and a product container for carrying a supply of the agricultural product to be dispensed by the device. The product container is operatively associated with the hopper and mounted thereabove for supplying product to the hopper through a valve disposed between the upper container and the hopper for selectively controlling the rate and quantity of product flowing from the container to the hopper by gravity feed.

U.S. Pat. Nos. 5,029,624; 5,060,701; 5,125,438; 5,224,527; and 5,379,812 exemplify known devices, particularly adapted for dispensing agricultural product in a closed system, which include a hopper for selectively dispensing the product and a product container mounted atop the hopper for supplying the hopper with additional product by gravity feed action controlled by the operation of a valve disposed between the hopper and the product container. The valve is actuated (i.e., opened or closed) by selective relative rotational movement between the upper product container and the lower hopper.

Other known agricultural devices are exemplified by U.S. Pat. No. 5,248,070 which discloses a measuring dispensing device, useful in connection with the application of liquid agricultural products. U.S. Pat. Nos. 5,301,848 and 5,156,372 disclose further examples of known metering devices for controlling the flow of granular material through a conduit which are useful in connection with agricultural dispensing devices such as planters. An additional example of a known metering device, useful in connection with closed granular chemical handling systems such as those exemplified by the aforementioned U.S. Pat. Nos. 5,029,624 and 5,060,701, is marketed under the trademark "SMART-BOX" by DuPont Agricultural Products. The device provides electronic metering of product dispensed from the agricultural device for more accurately monitoring the spacing of the dispensed product in the field.

It is a primary object of the present invention to provide a device for converting selective linear movement into corresponding rotary motion. It is a further object of the invention to provide an improved valve system employing said device for converting linear motion to rotary motion.

It is still a further object of the present invention to provide an agricultural dispensing device of the type including a product container mounted atop a hopper for supplying product from the container to the hopper by gravity feed, in which the quantity and flow rate of product from the container into the hopper is controlled by the improved valve system in accordance with the present invention.

It is yet a further object of the present invention to provide an agricultural dispensing device having structural support to enable the capacity of the product container carried by the hopper to be increased, the structural support being provided to counteract stresses resulting from the increased load of the container and from movement when the agricultural dispensing device is accelerated, decelerated, or changes its direction of travel.

In known plowing and planting procedures using standard agricultural equipment, including standard size storage containers and hoppers, a farmer is required to cease plowing and planting at regular intervals to refill the storage container of the agricultural vehicle. The time required for refilling the containers directly detracts from the plowing and planting time available to the farmer. However, increasing the storage capacity of the container on conventional equipment is not possible as a result of the lack of structural support for the increased load carried by the moving agricultural vehicle (to counteract inertial forces applied to the upwardly extending container as the vehicle accelerates, decelerates, or changes direction), and the inability of the existing valve systems to accommodate increased storage capacity and additional structural support for the increased storage capacity.

An agricultural dispensing vehicle in accordance with one object of the present invention overcomes the aforementioned disadvantages by providing increased storage capacity, structural support for the increased storage capacity, and modified valve means for accommodating the increased storage capacity and the additional structural support. In this manner, the agricultural device may be equipped with a larger storage container than conventional storage means for significantly decreasing the frequency at which plowing and planting operations must be ceased to refill the storage container on the vehicle. A farmer is therefore able to conduct the planting, plowing or other dispensing operations in a more cost and time effective manner than is possible with conventional equipment, and the added structural support for the increased storage capacity and the modified valve system permits the agricultural operation to proceed in a safe manner.

Other features and advantages of the improvements of the present invention will be apparent to those skilled in the art from the following discussion.

SUMMARY OF THE INVENTION

In accordance with one aspect of the present invention, a device for converting selective linear movement into corresponding rotary movement includes a supporting element movable in a linear orientation and two opposed drive pulleys mounted to said supporting element for permitting selective, conjoint linear displacement of the pulleys resulting from linear displacement of the supporting element. A cable having two free ends is mounted around the opposed pulleys and the free ends of the cable are fixedly mounted relative to the supporting element. The cable is also mounted around a rotatable element which is driven to rotate by the cable in response to the conjoint linear displacement of the opposed pulleys and the supporting element.

As the supporting element and the attached pair of opposed pulleys are linearly displaced in a first predetermined direction, the cable causes rotation of the rotary element, resulting in the lengthening of the cable extending between the rotary element and a first opposed pulley and the shortening of the cable extending between the rotary element and a second opposed pulley. Conjoint linear displacement of the pair of opposed pulleys and the supporting element in the opposite direction causes the opposite result—the length of cable extending between the rotary element and the first opposed pulley is decreased while the length of cable between the rotary element and the second opposed pulley is increased. Linear movement of the supporting element in the first predetermined direction results in rotation of the rotary element in a corresponding first preselected rotational direction, while linear movement in the second opposite direction results in rotation in a corresponding second opposite rotational direction. The conjoint linear movement of the pair of pulleys and the supporting element is controlled by a handle attached to the supporting element, and the handle can be moved manually.

The device described above converts linear displacement into corresponding rotational movement, at the selection of an operator. In a further aspect of the invention, the system described herein provides a rotary valve which is controlled by the linear displacement of the supporting element in a predetermined direction. Linear displacement in a first direction causes rotational movement of a rotatable valve component in a first direction to selectively open a valve. Linear displacement in the reverse linear direction causes corresponding rotational movement of the rotatable valve component in the opposite direction to selectively close the valve.

The rotary valve means in accordance with the present invention is particularly adapted for use in a closed granular chemical handling system of an agricultural dispensing device. In this aspect of the present invention, the rotary valve is disposed between a dispensing hopper on an agricultural vehicle and a product container mounted atop the dispensing hopper. Product from the top container is supplied to the lower dispensing hopper by gravity feed, and the quantity and rate of flow of product from the container to the hopper is selectively controlled by actuation and de-actuation of the rotary valve disposed therebetween. The rotary valve itself is selectively opened and closed by the operator of the agricultural device by linear displacement of an actuating arm (such as the supporting element for the opposed pulleys), which is selectively converted into corresponding rotational movement of a rotatable valve component.

An agricultural device in accordance with a further aspect of the present invention is provided with structure for accommodating the valve and for permitting linear displacement of the actuating arm by the operator. The device further includes supporting structure for carrying a product container having increased storage capacity and for the rotary valve, for reducing load and dynamic stress applied to the valve assembly and the product container resulting from, for example, acceleration, deceleration, or change of direction of the agricultural vehicle carrying the product container.

Thus, in accordance with one aspect of the present invention, the storage capacity of conventional planting and plowing agricultural equipment is increased by increasing the size of a product container carried by an agricultural vehicle. As a result of the increased size and load of the storage container, added structural support is provided to counteract inertial forces exerted on the product container and valve system during starting, stopping and changing of direction of the vehicle. As a result of the addition of the supporting structure for the larger container, the valve systems of known agricultural dispensing devices, as exemplified by the aforementioned prior art patents, cannot be employed in the modified device because the additional structural supporting elements interfere with access to and operation of the known valve means. Accordingly, the present invention provides a modified valve system which is compatible with the increased storage capacity product container and the added structural support means. The modified valve system is designed to convert linear movement into rotary movement for actuating the valve and is arranged to be readily accessible and easily operated by the farmer.

BRIEF DESCRIPTION OF THE DRAWINGS

FIG. 1 of the drawing illustrates a sectional view of a device in accordance with the present invention for converting linear movement into corresponding rotary movement, the linear displacement being illustrated in phantom;

FIG. 2 of the drawing illustrates a bottom plan view of the device illustrated by FIG. 1 further illustrating a clip operatively associated with a rotatable element for securing a cable to the outer surface thereof;

FIG. 3 of the drawing illustrates a sectional view taken through directional arrows A—A of FIG. 1;

FIG. 6 illustrates a side elevational view, partially in section, showing a valve including a device in accordance with FIG. 1 of the drawing, in two different linear positions relative to the agricultural dispensing device illustrated by FIGS. 4 and 5 of the drawing.

DESCRIPTION OF THE BEST MODES FOR CARRYING OUT THE INVENTION

Figure 4:
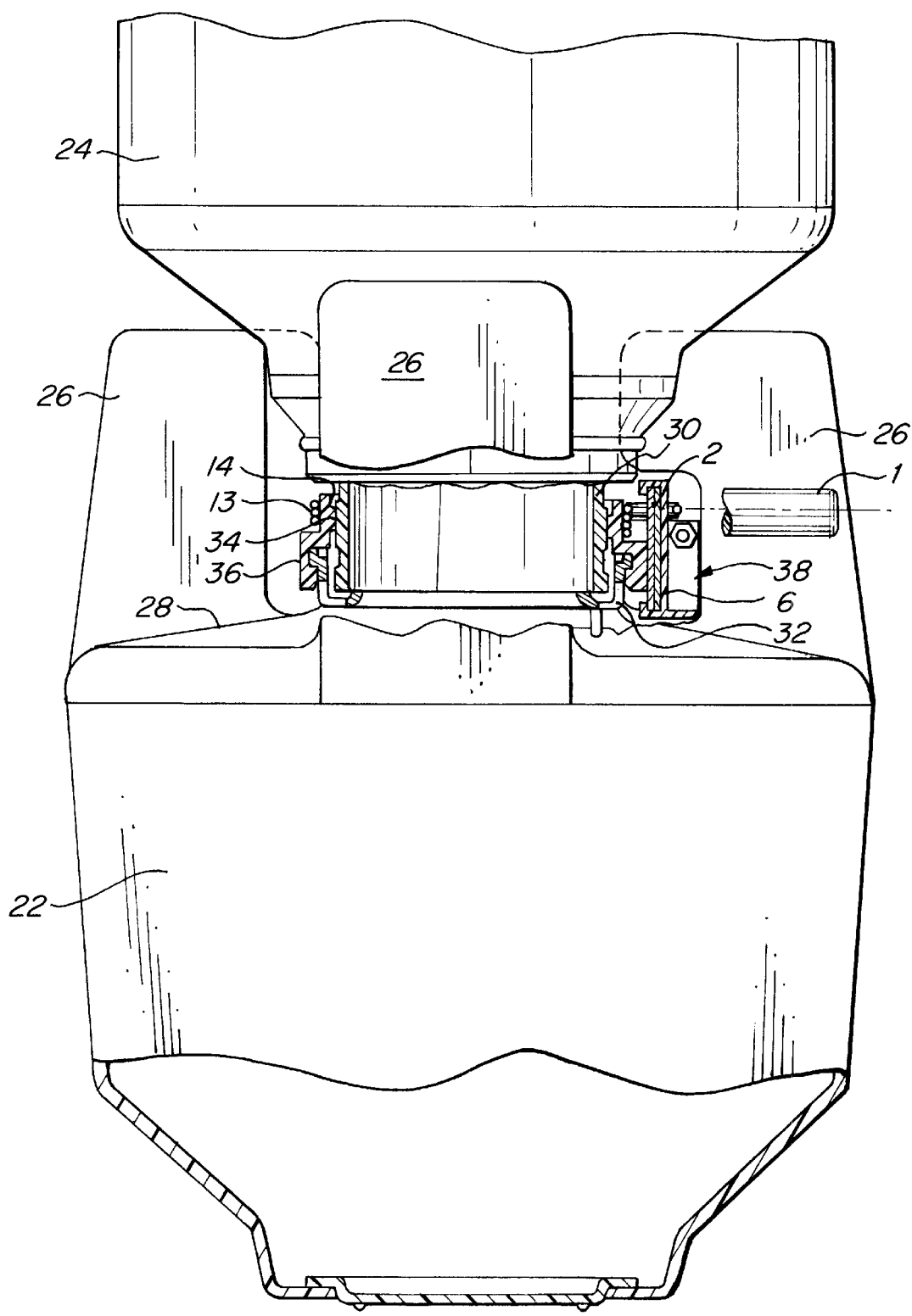
FIG. 4 of the drawing illustrates an elevational view, partially in section, of a valve system including the device illustrated by FIG. 1, disposed between a dispensing hopper and a product container mounted atop thereof, of an agricultural device for dispensing agricultural product.

The present invention will now be discussed with reference to FIGS. 1–6 of the drawing. FIGS. 1–3 illustrate the feature of the present invention broadly directed to a device for converting linear motion into rotary motion by means of a drive cable, while FIGS. 4–6 of the drawing illustrate the features of the invention directed to an agricultural device for dispensing material having a valve system employing said device for converting linear motion into rotary motion, and an agricultural vehicle including means for supporting a product container having increased storage capacity.

Referring first to FIGS. 1–3, a handle designated by reference numeral 1 is attached to a longitudinally oriented supporting element designated by reference numeral 2. The supporting element can be advanced and retracted in a linear direction by applying a force in the appropriate direction to the handle 1. The force may be applied to the handle manually, or by any other conventional means, as for example, by known magnetic or electrical actuation means. A first pulley 3 is rotatably mounted to the supporting element 2 proximate to the position at which the handle 1 is attached, while a second pulley 4 is rotatably mounted to the supporting element 2 proximate to a remote free end thereof. The pulleys 3 and 4 are each rotatably mounted to the supporting element by centrally disposed axles 5.

The pulleys 3 and 4 are mounted to the supporting element 2 at fixed positions thereon, and thus the distance between the pulleys remains constant notwithstanding linear movement of the supporting element 2. FIG. 1 illustrates pulleys 3 and 4 in a retracted linear position in which the handle 1 is moved into a rightward position as shown in the drawing. FIG. 1 also illustrates pulleys 3 and 4, shown in broken line, in their respective positions when the supporting element 2 is advanced in a linear direction by applying a force to handle 1 in a leftward direction as illustrated in the drawing figure. The linear displacement of the supporting element 2 between its advanced and retracted positions is illustrated by the arrows 20. The movement of the supporting element 2 in a linear direction, either advanced or retracted, displaces the pulleys 3 and 4, which move conjointly with the supporting element, a corresponding linear distance. However, the distance between the pulleys on the supporting element remains constant notwithstanding linear displacement of the supporting element since each of the pulleys is mounted to the supporting element at a fixed position thereon.

A bracket or sleeve, designated by reference numeral 6, is provided for receiving the supporting element 2, and permitting linear displacement of the supporting element therethrough in both the advanced and retracted directions. The bracket 6 supports opposed clips 9 and 10, and openings 7 and 8 for receiving respective adjustment screws 11 and 12 are defined in the clips 9 and 10 respectively. The bracket 6 is fixedly mounted relative to the linearly movable supporting element 2 and the two pulleys 3 and 4 conjointly movable therewith. Accordingly, the position of the clips 9 and 10 and the longitudinally oriented adjustment screws 11 and 12, which are fixedly mounted relative to the bracket, are also fixed relative to the linearly displaceable supporting element 2 and the pulleys 3 and 4 conjointly movable therewith.

A rotatable element such as a cylinder or drum designated by reference numeral 14 is rotatably mounted around a central axis 16. The rotatable element is mounted proximate to the stationary bracket 6, and the position of the center axis 16 of the rotatable element is fixed relative to the bracket 6. As illustrated in the drawing, in the preferred embodiment of the invention, the center axis 16 of the rotatable element 14 is aligned with the longitudinal center or midpoint of the fixed bracket 6.

Still referring to FIG. 1, the two free ends of a segment of cable 13 are affixed, respectively, to the adjustment screws 11 and 12 fixedly mounted to the top surface of the stationary bracket 6. The end of the cable 13 affixed to the adjustment screw 11 extends in a rightward direction and is looped around the pulley 3, while the end of the cable 13 attached to the adjustment screw 12 extends in a leftward direction and is looped around the pulley 4. The cable 13 is also looped around the outer surface of the rotatable element 14, and is retained thereon by a clip 15. Accordingly, the segment of cable 13 illustrated in the drawing extends around the outer surfaces of both the opposed rotatable pulleys 3 and 4, is looped around the rotatable element 14 disposed between the pulleys 3 and 4, and the two free ends of the cable 13 are attached, respectively, by adjustment screws 11 and 12 to fixed positions on the stationary bracket 6.

FIG. 2 of the drawing illustrates a bottom plan view of FIG. 1, and the same reference numerals have been used in FIG. 2 to designate corresponding elements illustrated in FIG. 1. FIG. 2 more clearly illustrates the locking clip 15 mounted to the rotatable element 14 for retaining the cable 13 around the outer periphery thereof. FIG. 2 further illustrates the linearly movable supporting element 2 received within the fixed bracket 6 for sliding movement therethrough, and the portions of the cable 13 retained around the opposed pulleys 4 and 5.

FIG. 3 of the drawing illustrates a sectional view taken through directional arrows A—A of FIG. 1. FIG. 3 more clearly illustrates the relationship between the linearly movable supporting element 2 slideably received within the stationary bracket 6, and one of the longitudinally extending adjustment screws received within the corresponding opening defined in the respective clip fixedly mounted to the bracket.

In operation of the device illustrated by FIGS. 1–3 of the drawing, the handle 1 and supporting element 2 are initially in the rightward position shown in solid line in FIG. 1. The supporting element 2 is linearly advanced in a leftward direction as illustrated in FIG. 1 by applying a suitable force to the attached handle 1, for linearly displacing the supporting element 2 and the pulleys 3 and 4 into their respective positions illustrated in broken line. The linear displacement of the supporting element 2 and the pulleys 3 and 4 relative to the fixed bracket 6 is illustrated by the arrows 20. As the supporting element and pulleys are conjointly displaced in a linear direction towards the left of FIG. 1, the cable 13 looped around the rotatable element 14 and retained thereon by the locking clip 15, drives the element 14 to rotate in a counterclockwise direction. The linear displacement of the supporting element 2 and the corresponding rotation of the element 14 increases the distance that the cable 13 extends from the center axis 16 of the element 14 (or the midpoint of the fixed bracket 6, or the position of the left adjustment screw 12) to the leftmost pulley 4. Since the overall length of cable 13 remains constant, the increase in the extension of the cable 13 in a leftward direction results in a corresponding decrease in the length of cable extending between the center axis 16 of the rotatable element 14 (or the midpoint of the stationary bracket 6, or the right adjustment screw 11) and the rightmost pulley 3.

Linear movement of the handle 1 and supporting element 2 in the opposite direction causes a reverse operation. Still referring to FIG. 1 of the drawing, when the handle 1 is linearly displaced rightwardly to retract the supporting element 2, the pulleys 3 and 4, which move conjointly with the supporting element 2, are also displaced in a rightward direction. The length of cable extending between the center axis 16 of the rotatable element 14 and the right pulley 3 increases while the length of cable extending between the axis 16 and the left pulley 4 correspondingly decreases. The rightward linear displacement of the pulleys causes the cable 13, having its two free ends fixedly mounted to the stationary bracket 6, to drive the rotatable element 14 in a clockwise rotational direction.

The device illustrated by FIGS. 1–3 of the drawing converts linear motion in a first direction into rotary motion in a first corresponding rotational direction, and converts linear motion in an opposed direction into rotary motion in a second corresponding opposed rotational direction. The use of a cable drive advantageously eliminates disadvantages of known drives, as for example, rack and pinion systems, which require precise and accurate alignment to function properly. The use of a cable drive for selectively converting reciprocating linear motion into corresponding reciprocating rotary motion provides the device with a greater degree of tolerance. The elimination of rack and pinion drive means advantageously reduces the likelihood of malfunction due to jamming since a cable drive system does not provide an environment conducive to accumulation of dirt, debris, or other materials hostile to the operation of the device.

The motion conversion device as illustrated by FIGS. 1–3 further advantageously provides a 2:1 ratio from the handle to the rotatable element resulting from the employment of a dual pulley system with a cable drive. Accordingly, the length of the linearly displaceable supporting element 2 is required to be only one-half of the length which would otherwise be required in a device employing a rack and pinion system, and no additional gearing is required to achieve the 2:1 ratio. The 2:1 ratio decreases the linear distance that the supporting element must be displaced to result in corresponding rotary motion of the rotatable element, thereby providing a more compact, economical and space efficient device.

Figure 5:
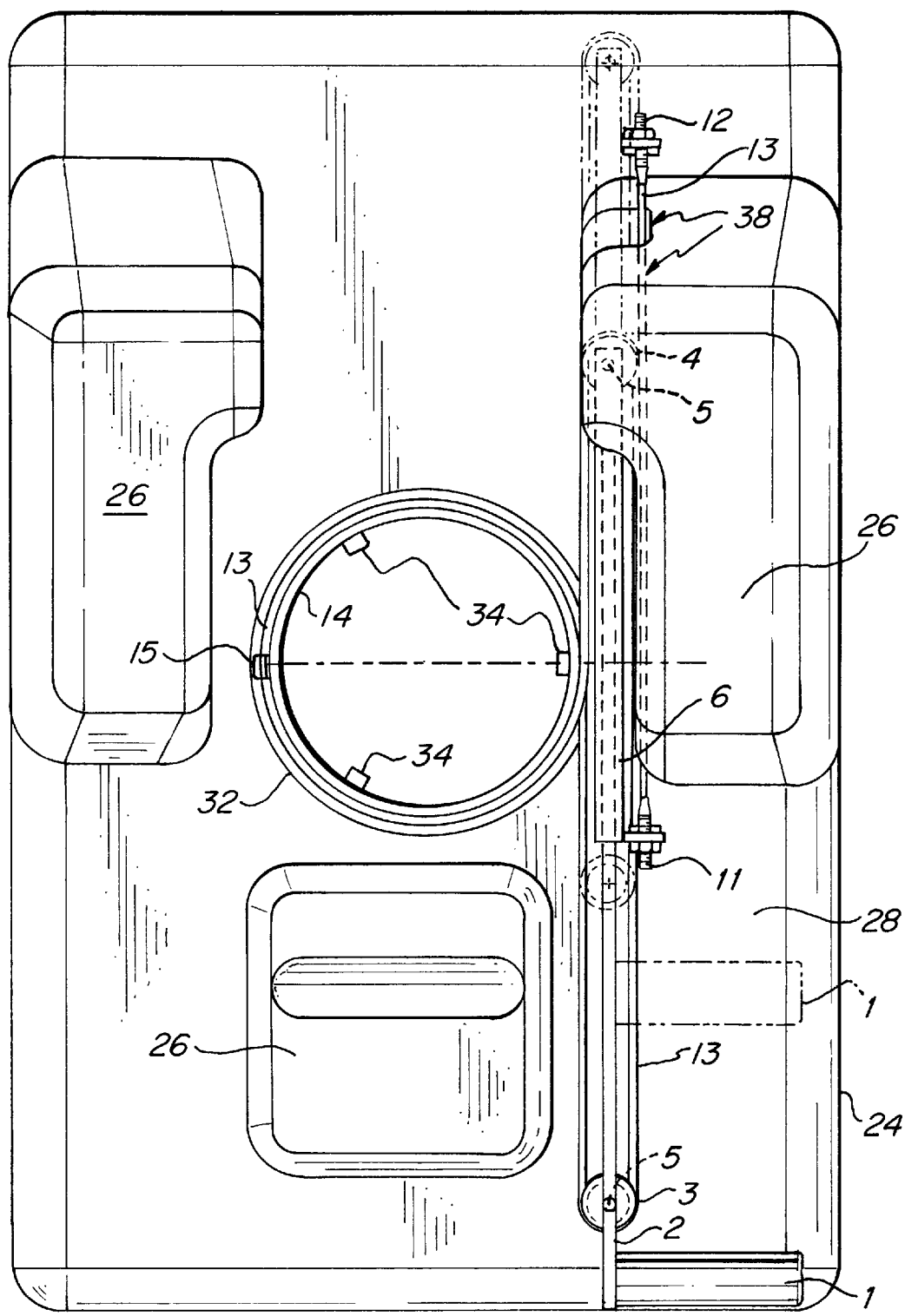
FIG. 5 of the drawing illustrates a top view, partially in section, illustrating the valve and supporting structure of the agricultural device shown by FIG. 4.

FIGS. 4–6 of the drawing illustrate a further aspect of the present invention, including the application of the device illustrated by FIGS. 1–3 to an agricultural dispensing device, and in particular an agricultural dispensing device of the type including a closed granular chemical handling system as exemplified by the aforementioned U.S. Pat. Nos. 5,029,624 and 5,060,701. Corresponding elements illustrated in FIGS. 1–3 are designated by the same reference numerals in FIGS. 4–6.

Referring first to FIG. 4, a dispensing hopper of the type employed in an agricultural vehicle, as for example, a planter, is generally designated by reference numeral 22. As discussed in greater detail in the aforementioned patents, the dispensing hopper receives material from a storage container mounted atop thereof by manually rotating the storage container relative to the hopper to open a rotary valve to permit product to drop downwardly from the storage container into the hopper by gravity feed.

Still referring to FIG. 4 of the drawing, a storage container for product to be dispensed from the hopper 22 is generally designated by reference numeral 24. The storage container 24 is mounted atop the hopper 22 to supply product in the storage container to the hopper by gravity feed through a valve system disposed therebetween, to be described in greater detail below. As will become apparent from the following description, the product container 24 in accordance with the present invention has a storage capacity significantly greater than that of known agricultural dispensing systems, thereby enabling a farmer or other agricultural worker to dispense a greater quantity of material from the hopper 22 and to reduce the frequency of interruption of the dispensing operation for refilling the storage container with material to be dispensed, thereby increasing the overall efficiency and reducing the cost of the agricultural dispensing operation.

Three protuberances 26 extend substantially vertically upwardly from the top surface 28 of the hopper 22. The protuberances 26, which are positioned around the product storage container 24, are provided for structurally supporting the product container when it is mounted atop the hopper 22. As noted, the container 24 is of a relatively large capacity for storing a relatively large quantity of material to be dispensed from an agricultural dispensing vehicle. The weight of the fully loaded storage container, particularly when positioned atop a moving agricultural vehicle, can adversely affect the structural integrity of the overall agricultural device, resulting in possible damage to the storage container itself and to the means coupling the storage container to the hopper therebelow. The protuberances 26 provide structural support for the storage container 24 and counteract inertial forces exerted on the storage container and the coupling means as a result of stopping, starting and changing the direction of travel of the moving agricultural vehicle on which the container is mounted.

The product container 24 is removably mounted atop the hopper 22 by a mating bias valve system including a valve component 30 of the container 24 inserted into a valve component 32 of the hopper 22. Lugs 34 of the hopper valve component 32 engage threads 36 of the product container valve component 30. The valve system couples the upper product container 24 to the lower hopper 22 such that selective rotation of the valve component 32 of the hopper 22 in a preselected direction draws the mating valve components of the hopper and product container together, opening the valve and permitting product to flow by gravity feed from the upper product container into the lower hopper. Rotation in the opposite direction closes the valve.

In accordance with a further aspect of the present invention, the device for converting linear motion into rotary motion, as discussed with respect to FIGS. 1–3, is employed to rotate the valve component 32 of the hopper to selectively open and close the valve means coupling the container 24 to the hopper 22 for selectively permitting flow of material from the upper container into the lower hopper by gravity feed. The use of the device of FIGS. 1–3 for actuating the valve means disposed between the product container and the hopper eliminates the requirement of physically manually rotating the product container relative to the hopper as in the known prior art devices. By eliminating manual rotation of the product container, it is unnecessary to design or arrange the supporting protuberances 26 to provide direct manual access to the product container, thereby enabling the protuberances to be positioned around the product container to provide effective structural support therefor.

Still referring to FIG. 4 of the drawing, reference numeral 38 designates a recessed or cut-out portion of one of the protuberances 26 for receiving therein the motion conversion device previously discussed with respect to by FIGS. 1–3 of the drawing. FIG. 4 illustrates the handle 1, the supporting element 2, a portion of the cable 13, and the rotatable element 14, corresponding to the structure shown in FIG. 1.

FIGS. 5 and 6 illustrate, respectively, a top plan view of the embodiment of FIG. 4, partially in section, and a side elevational view of the embodiment of FIG. 4, partially in section. These drawings show, in greater detail, the structural and functional relationship between the motion conversion device illustrated by FIGS. 1–3 as applied to a valve system in the embodiment of the invention illustrated by FIG. 4.

Referring first to FIG. 5 of the drawing, the three supporting protuberances 26 extend upwardly from the top surface 28 of the hopper 22, are arranged around valve component 32 of the dispensing hopper 22, and thus surround the upwardly extending product container 24 when it is coupled to the hopper. The lugs 34 of the hopper valve component 32 extend inwardly to engage threads 36 of the valve component 30 of the product container (shown in FIG. 4). Although the drawings illustrate three supporting elements 26 arranged to surround the product container, it is within the scope of the present invention to vary the number, arrangement and configuration of the supporting elements from that shown in the drawings.

FIG. 5 also illustrates the motion conversion device of FIGS. 1–3 employed as valve means in the dispensing hopper and product container system illustrated by FIG. 4. Corresponding elements in FIG. 5 (and FIG. 6) are designated by the same reference numerals as those in FIGS. 1–3. The handle 1 for linearly moving the supporting element 2 carrying the pair of opposed pulleys 3 and 4, is movably mounted on the upper surface 28 of the hopper 22. A cut-out or recessed area, designated by reference numeral 38, is defined in one of the protuberances 26 to receive the motion conversion device, and to permit selective linear movement of the supporting element 2. FIG. 5 further illustrates the stationary supporting bracket or sleeve 6 of the motion conversion device, and the adjustment screws 11 and 12 on the bracket 6 for attaching the ends of the cable 13 thereto. The handle 1 is also shown in broken line to illustrate the range of linear movement of the handle and the supporting element 2 of the motion conversion device of FIGS. 1–3 in relation to the agricultural dispensing system illustrated by FIGS. 4–6.

FIG. 5 further illustrates the cable 13, as shown and discussed with respect to FIGS. 1–3, extending around the pulleys 3 and 4 and a rotatable hub 14 of the valve component 32 of the dispensing hopper. The hub 14 corresponds to the rotatable element 14 illustrated in FIG. 1. The clip 15 is provided to retain the cable 13 engaged around the periphery of the rotatable hub 14.

Still referring to FIG. 5, when the handle 1 is advanced from the position shown in solid line to the position shown in broken line, the supporting element 2 and the pulleys 3 and 4 are moved in a linear direction relative to the upper surface 28 of the hopper. Linear displacement of the handle 1 moves the pulley 4 at the remote end of the supporting element 2 from the position shown in solid line to the position shown in broken line. As will be discussed in greater detail below, mating valve means disposed between the product container and the hopper is opened when the handle 1 and the pulleys 3 and 4 are in the solid line position, and is closed when the handle and the pulleys are in the position shown in broken line. As the supporting element 2 and the conjointly movable pulleys 3 and 4 are moved linearly relative to the stationary bracket 6, (which is fixedly mounted to the upper surface 28 of the hopper), the cable retained on the outer surface of the rotatable hub 14 by the locking clip 15 drives the hub into rotation. Linear movement of the supporting element in a direction towards the left (into the broken line position of the handle 1) in FIG. 5 will cause the hub to rotate in a counterclockwise direction, while linear movement of the supporting element 2 in a direction towards the right (into the solid line position of the handle 1) will cause the hub 14 to rotate in a clockwise direction.

As the rotatable hub 14 (and thus the hopper valve component 32) is rotated in a first direction as a result of linear movement of the supporting element in a first corresponding linear direction, the lugs 34, which are carried by the hopper valve component 32 and engage the threads 36 of the product container valve component 30, cause the product container to rotate downwardly towards the hopper and became firmly seated on the hopper as a result of the threading engagement of the lugs 34. The downwardly threading rotational movement of the product container relative to the hopper opens the mating valve means coupling the product container and the hopper to permit flow of product, by gravity feed, from the upper product container down into the lower hopper. Since the upper product container is filled, the weight of the product in the loaded container assists in firmly seating the container on the hopper as the threaded product container valve component is engaged by the lugs carried by the rotating hub of the hopper valve component.

Linear movement of the supporting element 2 in the opposite direction results in the reverse operation, causing the hub 14 to rotate in the opposite direction. Reverse rotation of the hub causes the lugs 34 carried by the hub of the hopper valve component 32 to unthread relative to the threads 36 defined in the product valve component 30, causing the product container to move upwardly relative to the hopper and unseat from the hopper valve component as a result of the disengagement of the lugs 34 from the threads 36. The upward movement of the product container relative to the hopper is aided by the substantially empty or unloaded state of the container, decreasing the weight thereof. The valve means disposed between the upper product container and the lower hopper closes as the hub 14 is rotated in the reverse direction, and the product container 24 can be removed from the hopper 22 once the lugs completely disengage from the threads. Prior to disengagement and removal, the valve means between the product container and the hopper is closed so that the product within the hopper is sealed.

The valve means discussed above comprise a mating bias system in which selective movement of one valve component relative to another (as for example, a spring biased valve element carried on one component and an actuator carried on the other component) causes a valve to be opened or closed. Such valve systems are generally known to the art and are exemplifed by U.S. Pat. Nos. 5,029,624 and 5,060,701 previously discussed herein as background information.

FIG. 6 illustrates a side elevational view, partially in section, of the hopper 22 including the supporting protuberances 26 extending upwardly from the upper surface 28 of the hopper, and the linear to rotational motion conversion device (of FIGS. 1–3) mounted to a portion of the upper surface of the hopper. Elements illustrated in FIG. 6 corresponding to elements illustrated in FIG. 1 have been designated with the same reference numerals. The motion conversion device of FIGS. 1–3 is mounted to the upper surface 28 of the hopper 22 by the fixed element or bracket 6. The supporting element 2, which is selectively linearly movable relative to the fixed bracket 6, carriers the pulleys 3 and 4 which are mounted at fixed positions thereon and conjointly movable therewith. Selective linear movement of the supporting element 2 in both advanced and retracted linear directions results from applying a force in the corresponding direction to handle 1 attached to the supporting element 2. The adjustment screws 11 and 12, attached to the free ends of the cable 13, are shown mounted at separate positions on the stationary supporting bracket 6. The pulleys 3 and 4 are rotatably mounted to the supporting element 2 by axles 5, and the cable 13 is looped around the opposed pulleys 3 and 4.

As illustrated in FIGS. 4–5 and as previously discussed herein, the cable 13 is also looped around a rotatable hub (disposed in a fixed position intermediate between the two pulleys) for rotating the hub in preselected directions for selectively opening and closing the valve means coupling the hopper to the product container mounted atop thereof. Linear movement of the supporting element 2 in preselected directions causes rotation of the rotatable hub in corresponding preselected rotational directions. The rotatable hub is designated by reference numeral 14 in FIG. 6. The range of linear movement of the supporting element 2 relative to the fixed bracket 6 (and thus to the upper surface 28 of the hopper 22 at which the stationary bracket 6 is mounted) for selectively opening and closing the rotary valve means is designated by reference numeral 40.

The present invention discussed herein, in a first aspect thereof, is generally directed to a device for selectively converting linear movement into corresponding rotational movement. In a further aspect of the invention, the motion conversion device is adapted for use in connection with a rotary valve system, and in particular, a rotary valve system of an agricultural device, such as that generally exemplified by the closed handling system disclosed in U.S. Pat. Nos.

5,029,624 and 5,060,701, for coupling a product storage container to a dispensing hopper. In a further aspect of the present invention, an improved agricultural vehicle is designed to increase the storage capacity of a product container mounted to a dispensing hopper (without adversely affecting the structural integrity of the container or associated coupling means), for decreasing the frequency at which agricultural dispensing procedures, such as planting and plowing, must be interrupted to refill the product container carried on the agricultural vehicle, thereby increasing the efficiency and economy of the overall agricultural procedure.

Other improvements and advantages falling within the scope of the present invention will become apparent to those skilled in the art. Accordingly, the discussion of the preferred embodiments of the invention herein are intended to be illustrative only and not restrictive of the scope of the invention, that scope being defined by the following claims and all equivalents thereto.

I claim:

1. A device for converting linear motion into rotary motion, said device comprising:
    a supporting element selectively movable in a substantially linear orientation,
    a pair of pulleys mounted to said supporting element for conjoint linear movement therewith,
    a rotatable element operatively associated with said supporting element, and
    a cable engaging said pair of pulleys and said rotatable element for driving said rotatable element in a rotating movement in response to linear movement of said supporting element.

2. The device as claimed in claim 1 further including supporting means fixedly mounted relative to said supporting element such that said supporting element is linearly movable relative to said supporting means.

3. The device as claimed in claim 2 wherein said cable has two free ends, and said supporting means includes means for attaching each of said free ends of said cable to a fixed position on said supporting means.

4. The device as claimed in claim 3 wherein each of said free ends of said cable is attached to a different one of said fixed positions on said supporting means.

5. The device as claimed in claim 2 wherein said supporting means is a bracket fixedly mounted relative to said linearly movable supporting element.

6. The device as claimed in claim 2 wherein said supporting means is a sleeve fixedly mounted relative to said supporting element for receiving said supporting element as said supporting element is moved linearly relative to said sleeve.

7. The device as claimed in claim 1 wherein said pair of pulleys and said rotatable element are arranged such that movement of said supporting element in a first linear direction causes said rotatable element to rotate in a corresponding first rotational direction.

8. The device as claimed in claim 7 wherein said pair of pulleys and said rotatable element are arranged such that movement of said supporting element in a second opposed linear direction causes said rotatable element to rotate in a corresponding second opposed rotational direction.

9. The device as claimed in claim 1 further including means for selectively moving said supporting element in a preselected linear direction.

10. The device as claimed in claim 9 wherein said means for moving includes a handle on said supporting element for selectively applying a manual force to said handle for displacing said supporting element in said preselected linear direction.

11. The device as claimed in claim 1 wherein said rotatable element defines an outer surface, said device further including means for retaining said cable engaged on said outer surface of said rotatable element for driving said rotatable element in said rotating movement.

12. The device as claimed in claim 11 wherein said means for retaining is a releasable, lockable clip mounted to said rotatable element proximate to said outer surface thereof.

13. A granular applicator device comprising:
    a hopper including means for dispensing granular material therefrom,
    a container mountable atop said hopper for storing and providing to said hopper said material to be dispensed from said hopper,
    and valve means disposed between said container and said hopper for controlling the flow of said material from said container into said hopper, said valve means comprising means for converting selective linear movement into corresponding rotary movement in one of two preselected rotational directions for selectively opening and closing said valve means when said container is mounted atop said hopper.

14. The device as claimed in claim 13 wherein said means for converting includes a linearly movable supporting element, a pair of pulleys mounted thereto and conjointly movable therewith, and a rotary element operatively associated with said supporting element such that a cable engaging said pulleys and said rotary element drives said rotary element in one of said two preselected rotational directions corresponding to said direction of linear movement of said supporting element.

15. The device as claimed in claim 13 wherein said valve means are arranged relative to said hopper and said container such that said corresponding rotary movement of said valve means in one of said two preselected rotational directions seats said container on said hopper for opening said valve means disposed therebetween, and said corresponding rotary movement in said second of said two preselected rotational directions unseats said container from said hopper to close said valve means disposed therebetween.

16. The device as claimed in claim 15 wherein said valve means includes a first valve component associated with one of said container and said hopper, and a second valve component associated with the other of said container and said hopper, said first valve component being operatively associated with said means for converting such that said first valve component is selectively rotatable in said two preselected rotational directions,
    said first valve component carrying at least one lug rotatable therewith, said second valve component being threaded, said lug engaging said thread for selectively seating and unseating said container relative to said hopper in response to rotational movement of said first valve component in said two preselected rotational directions, respectively.

17. The device as claimed in claim 16 further including actuating means for said means for converting, said means for actuating means including an element selectively movable in a forward and a reverse linear direction corresponding, respectively, to said first and second preselected rotational directions of said first valve component, said valve means being controlled by seating and unseating said container on said hopper by selectively moving said element in said forward and reverse linear directions.

18. An agricultural vehicle comprising:

a hopper for dispensing material from said vehicle;

a container mounted atop said hopper for storing said material and for supplying said material to said hopper therebelow;

supporting means for said container, said supporting means providing structural support for said upwardly extending container for counteracting forces on said container as a result of movement of said vehicle;

said supporting means comprising a plurality of protuberances extending upwardly from a top surface of said hopper, said protuberances being provided proximate to said container;

valve means separate from said supporting means, said valve means disposed between said hopper and said container for controlling the flow of said material from said container downwardly into said hopper; and means for actuating said valve means, said means for actuating said valve means being received, at least in part, in said supporting means for said container.

* * * * *